3,816,509
ESTERS OF 3-PHENYLADAMANTANE-1-
CARBOXYLIC ACID
Carl Peter Krimmel, Wauconda, Ill., assignor to
G. D. Searle & Co., Chicago, Ill.
No Drawing. Continuation-in-part of application Ser. No.
838,644, July 2, 1969, now Patent No. 3,663,565. This
application Dec. 2, 1971, Ser. No. 204,311
Int. Cl. C07c 93/20
U.S. Cl. 260—469    3 Claims

ABSTRACT OF THE DISCLOSURE

Dialkylaminoalkyl amides, esters, thioamides, and thioesters of 3-phenyladamantane - 1 - carboxylic acid are described herein. They possess anti-bacterial, antiprotozoal, anthelmintic, anti-fungal, anti-algal, and anti-viral activity. The compounds are prepared from 3-phenyladamantane-1-carboxylic acid or the corresponding acid chloride.

---

The present application is a continuation-in-part of application Serial No. 838,644, filed July 2, 1969, and now Patent No. 3,663,565.

The present invention relates to a group of derivatives of 3-phenyladamantane - 1 - carboxylic acid. More particularly, it relates to a group of compounds having the following general formula

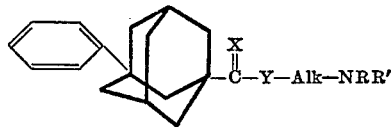

wherein X is selected from the group consisting of O and S; Y is

or an element of periodic group VI of an atomic weight less than 40; Alk is alkylene separating the atoms attached thereto by at least two carbon atoms; R" is selected from the group consisting of hydrogen and lower alkyl; and —NRR' is selected from the group consisting of di(lower alkyl) amino and cyclic amino. Examples of cyclic amino radicals are 1-pyrrolidinyl, piperidino, morpholino, and 4-methyl-1-piperazinyl.

The elements of periodic group VI referred to above are O and S.

The alkylene radicals referred to above contain up to 7 carbon atoms and can be exemplified by ethylene, propylene, trimethylene, tetramethylene, pentamethylene, hexamethylene and heptamethylene. The lower alkyl radicals referred to above contain up to 6 carbon atoms and can be exemplified by methyl, ethyl, propyl, isopropyl, butyl, and the like.

The organic bases of this invention form pharmaceutically acceptable salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, methyl benzenesulfonate, ethyl toluenesulfonate, ethylene chlorohydrin, propylene chlorohydrin, allyl bromide, methallyl bromide, and crotyl bromide.

The compounds of this invention are conveniently prepared by the reaction of a compound of the formula HY—Alk—NRR', where Alk, —NRR', and Y are defined as above, with a 3-phenyladamantane-1-carboxylic acid halide. The acid chloride is preferred for this reaction and the reaction is carried out in an inert solvent. Benzene or a tertiary amine such as pyridine can be used as the solvent. In some instances, it may be necessary to apply external heat to the mixture in order for more complete reaction to take place. To prepare the thioamides of the present invention, the appropriate amide is heated with phosphorus pentasulfide in a solvent such as pyridine.

The present esters can also be conveniently prepared by the reaction of a 3-phenyladamantane-1-carboxylic acid with an appropriate aminoalkyl halide in a solvent such as 2-propanol.

The compounds of the present invention are useful because of their anti-biotic activity against a variety of organisms. Thus, they inhibit the growth of bacteria such as *Diploccus pneumoniae*, *Bacillus subtilis*, and *Escherichia coli*, protozoa such as *Tetrahymena gelleii*, *Tritrichomonas foetus*, and *Trichomonas vaginalis*, helminths such as *Turbatrix aceti*, fungi such as *Trichophyton mentagrophytes*, *Candida albicans*, and *Ceratocystis ulmi*, and algae such as *Chlorella vulgaris*. The present compounds can thus be combined with various known excipients and adjuvants in the form of dusts, solutions, suspensions, ointments, and sprays to provide compositions useful for disinfecting purposes.

The anti-bacterial activity of the present compounds is evident from the result of a standardized test whereby a mixture of 5 mg. of compound with 5 ml. of sterile nutrient broth is heated at 80° C. for 20 minutes, then cooled to around 25° C., and finally serially diluted and mixed with sufficient quantities of a mixture of sterile nutrient broth and 1% of a culture of *Bacillus subtilis* to produce concentrations of approximately 400, 100, 25, and 6 mcgm. of compound per ml. The resultant mixtures are incubated for 20–24 hours at 37° C. Controls are provided by concurrent incubation identical with the foregoing excepting that no compound is present. Activity is determined by gross examination; and potency is expressed as the minimum concentration, in mcgm. of compound per ml., at which no growth of the test organism is discernible. When tested according to the above procedure, diethylaminoethyl 3-phenyladamantane - 1 - carboxylate hydrochloride, N - (2 - diethylaminoethyl)-3-phenyladamantane - 1 - carboxamide, and N 1 (7 - diethylaminoheptyl) - 3 - phenyladamantane - 1 - carboxamide each were active against the bacteria at a concentration of at least 400 mcgm./ml. 5-diethylaminopentyl 3-phenyladamantane - 1 - carboxylate and S-(2-dimethylaminoethyl) 3-phenyladamantane-1-thiocarboxylate were likewise found to be active against *Bacillus subtilis* although they were tested by a somewhat different procedure.

Evidence of the anti-protozoal utility of the present compounds is provided by standardized tests for their capacity to inhibit the growth of *Tritrichomonas foetus* and *Trichomonas vaginalis* which are carried out in the following manner. A modified Diamond medium is prepared by mixing 1200 parts of trypticase (Baltimore Biological Laboratories), 600 parts of yeast extract (Difco), 300 parts of maltose, 60 parts of L-cysteine hydrochloride, 12 parts of L-ascorbic acid, 48 parts of dibasic potassium phosphate, and 54,000 parts of distilled water. The pH is adjusted to 6.8 with 4% sodium hydroxide solution and 30 parts of agar (Baltimore Biological Laboratories) is incorporated. The mixture is boiled for one minute to dissolve the agar and it is then sterilized in an autoclave. To 80 volumes of the resultant medium is aseptically added 20 volumes of sterile Dubos medium serum. The resultant medium is inoculated with 1% (by volume) of either a 48-hour or a 72-hour culture of *T. foetus* or *T. vaginalis*, whereupon 1 ml. of the inoculated medium is mixed with 10 mg. of test compound. The mixture is incubated anaerobically at 37° C. for 48 hours and then examined microscopically for the presence of motile trichomonads. If any are observed, the compound is considered inactive. If no motile trichomonads are observed, 0.1 ml. of the incubated mixture is serially diluted and mixed with additional quantities of the inoculated medium sufficient to produce concentrations of 1000, 100, 10, and 1 microgram of test compound per ml., and the resultant mixtures are incubated anaerobically as before at 37° C. for 48 hours and then examined microscopically for the presence of motile trichomonads. Controls are provided by concurrent incubations identical with the foregoing except for the absence of test compound. When tested according to the above procedure, diethylaminoethyl 3-phenyladamantane - 1 - carboxylate hydrochloride, N - (2 - diethylaminoethyl)-3-phenyladamantane - 1 - carboxamide and N-(7-diethylaminoheptyl) - 3 - phenyladamantane-1-carboxamide each showed antiprotozoal activity at a concentration of 1000 micrograms/ml. or less. 5-diethylaminopentyl 3-phenyladamantane - 1 - carboxylate and S-(2-dimethylaminoethyl 3-phenyladamantane-1-thiocarboxylate were likewise found to be active against *Trichomonas vaginalis* although these compounds were tested by a somewhat different procedure.

The present compounds have also shown anti-viral activity. Thus, they have shown activity against polio 1 and against strains of $A_1$ and B influenza virus. In addition, the present compounds inhibit germination of seeds of Trifolium.

The following examples are presented to further illustrate the present inventions; they should not be construed as limiting it in spirit or in scope. In these examples, quantities by weight are indicated in grams, quantities by volume are indicated in milliliters, and temperatures are indicated in degrees centigrade (° C.).

EXAMPLE 1

A mixture of 4.5 grams of 3-phenyladamantane-1-carboxylic acid and 20 ml. of thionyl chloride is refluxed for 3 hours. Unreacted thionyl chloride is removed by distilling the mixture under reduced pressure on a steam bath. Azeotropically dried benzene is added to the residue and distillation is resumed to remove final traces of thionyl chloride. The residual 3-phenyladamantane-1-carbonyl chloride is then dissolved in 30 ml. of anhydrous benzene and to this solution there is added a solution of 2.0 grams of 2-diethylaminoethylamine in 20 ml. of anhydrous benzene. The mixture is refluxed for 2 hours and the benzene is removed under reduced pressure. The residue is dissolved in distilled water and resultant solution is extracted with anhydrous ethyl ether. The aqueous layer is separated and made alkaline with potassium carbonate and then extracted with anhydrous ethyl ether. The ether extract is dried over anhydrous potassium carbonate, treated with charcoal, and filtered, and the solvent is evaporated from the filtrate. The residue is distilled under reduced pressure to give a pale yellow, viscous oil boiling at about 204–210° C. at 0.2 to 0.4 mm. pressure. The product obtained in this way is N-(2-diethylaminoethyl) - 3 - phenyladamantane-1-carboxamide which solidifies on standing to give a waxy solid melting at about 44–48° C. This compound has the following formula:

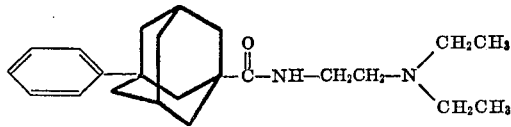

EXAMPLE 2

A solution of 1.0 grams of N-(2-diethylaminoethyl)-3-phenyladamantane-1-carboxamide, 0.6 gram of ethyl bromide, and 20 ml. of 2-butanone is allowed to stand for 4 days in a stoppered flask. The resulting solution is diluted with anhydrous ethyl ether and the precipitate which forms is separated by filtration and dried in a steam cabinet. The product obtained in this way is N-(2-diethylaminoethyl) - 3 - phenyladamantane - 1 - carboxamide ethobromide melting at about 193–197° C.

EXAMPLE 3

The 3-phenyladamantane - 1 - carbonyl chloride, obtained from 2.0 grams of the corresponding acid according to the procedure described in Example 1, is dissolved in 100 ml. of benzene, mixed with a solution of 1.0 gram of N,N-diethyl-1,4-butanediamine and 1.0 gram of pyridine, and allowed to stand for 16 hours. The solvent is removed under reduced pressure and the residue is dissolved in dilute hydrochloric acid. The resulting solution is extracted with ether and then made alkaline with aqueous sodium hydroxide. The alkaline solution is extracted with ether and the ether layer is separated and the solvent is evaporated to leave a yellow oil. The oil is purified first by chromatography on neutral alumina followed by elution with hexane and benzene. The oil is then distilled to give N - (4-diethylaminobutyl)-3-phenyladamantane - 1-carboxamide boiling at about 195–198° C. at 0.05 mm. pressure.

EXAMPLE 4

The procedure of Example 3 is repeated using the acid chloride from 2.5 grams of 3-phenyladamantane-1-carboxylic acid and 2.0 grams of N,N-diethyl-1,5-pentanediamine. In this case, the free base is dissolved in 2-propanol and mixed with a solution of hydrogen chloride in 2-propanol. The solid which precipitates is separated by filtration and recrystallized from acetone to give N-(5-diethylaminopentyl)-3-phenyladamantane - 1 - carboxamide hydrochloride melting at about 156–157° C.

EXAMPLE 5

4.5 grams of 3-phenyladamantane-1-carboxylic acid is converted to the acid chloride and reacted with 3.3 grams of N,N-diethyl-1,7-heptanediamine according to the procedure described in Example 1. The mixture is refluxed for 2 hours and then allowed to stand for 16 hours. Two layers appear and these are diluted by adding water and ethyl ether. After thorough shaking, the aqueous layer is separated and made alkaline with potassium carbonate and the resulting mixture is extracted with anhydrous ethyl ether. The ether extract is dried and treated with charcoal and the solvent is evaporated. The residue is distilled under reduced pressure to give N-(7-diethylaminoheptyl) - 3 - phenyladamantane-1-carboxamide boiling at about 234–248° C. (0.3 mm. pressure).

EXAMPLE 6

3-phenyladamantane - 1 - carbonyl chloride is prepared from 2.5 grams of the corresponding carboxylic acid according to the procedure described in Example 1. The acid chloride is dissolved in 100 ml. of benzene, mixed with a solution of 2.5 grams of 1-(2-aminoethyl)pyrrolidine and stirred for 90 minutes. The solvent is then removed under reduced pressure and the residue is dissolved in dilute hydrochloric acid. The aqueous solution is extracted with ether and then made alkaline. The solid which forms is extracted with chloroform and the chloroform solvent is evaporated from the extract. The residual base is dissolved in 2-propanol and mixed with a solution of hydrogen chloride in 2-propanol. The precipitate which forms is separated by filtration and recrystallized from a mixture of methanol and acetone to give N-[2-(1-pyrrolidinyl)-ethyl] - 3 - phenyladamantane - 1 - carboxamide hydrochloride melting at about 189–191° C. with decomposition.

The procedure of the preceding paragraph is repeated using 1-(3-aminopropyl)pyrrolidine in place of the 1-(2-aminoethyl)pyrrolidine. The base is converted to the hydrochloride which is recrystallized from a mixture of methanol and ethyl acetate to give N-[3-(1pyrrolidinyl)propyl] - 3 - phenyladamantane - 1 - carboxamide hydrochloride melting at about 169–170° C. with decomposition.

EXAMPLE 7

If 1 - (3 - aminopropyl) piperidine, 4-(2-aminoethyl)-morpholine, and 1-(3-aminopropyl) - 4 - methylpiperazine are each reacted with 3 - phenyladamantane - 1 - carbonyl chloride according to the procedure described in Example 1, the products obtained are, respectively, N-(3-piperidinopropyl) - 3 - phenyladamantane - 1 - carboxamide, N-(2-morpholinoethyl) - 3 - phenyladamantane-1-carboxamide, and N-[3-(4 - methyl - 1 - piperazinyl)propyl]-3-phenyladamantane-1-carboxamide.

Likewise, if 1-(2 - aminoethyl)piperidine, 4-(3-aminopropyl)morpholine, and 1-(2-aminoethyl)-4-methylpiperazine are each used in the above reaction, the corresponding amide is obtained in each instance.

EXAMPLE 8

6.0 grams of 3-phenyladamantane-1-carboxylic acid is converted to the acid chloride and then reacted with 3.3 grams of N,N,N'-triethylethylenediamine according to the procedure described in Example 1. The mixture is heated on a steam bath for 15 minutes and then cooled to room temperature. The precipitate which forms is removed by filtration and the solvent is removed from the filtrate under reduced pressure. The residue is diluted with water to give a heterogeneous mixture which is extracted with ether. The ether extract is washed with water, dried over anhydrous sodium sulfate, and treated with charcoal. The solvent is then evaporated from the filtered ether solution and the residue is distilled under reduced pressure to give the free base boiling at about 242–248° C. at 2.0 mm. pressure. To a solution of 1.3 grams of the above base in 200 ml. of anhydrous ether there is added, with stirring, 1.0 ml. of a 7 N solution of anhydrous hydrogen chloride in 2-propanol. The precipitate which forms becomes crystalline and it is separated by filtration and dried in a steam cabinet to give N-ethyl-N-(2-diethylaminoethyl)-3-phenyladamantane-1-carboxamide hydrochloride hemihydrate melting at about 155–158° C.

If the above procedure is repeated using N,N,N'-trimethylethylenediamine in place of the N,N,N'-triethylethylenediamine, the amide obtained is N-methyl-N-(2-dimethylaminoethyl) - 3 - phenyladamantane - 1 - carboxamide.

EXAMPLE 9

A solution of 2.3 grams of N-(2-diethylaminoethyl)-3-phenyladamantane-1-carboxamide and 1.6 grams of phosphorus pentasulfide in 20 ml. of pyridine is refluxed for 2 hours and then allowed to stand for 16 hours. The pyridine is then evaporated from the solution, the residue is treated with water, and the aqueous mixture is extracted with chloroform. The chloroform is evaporated and the residual base is chromatographed on neutral alumina using elution with hexane and benzene. It is then distilled under reduced pressure to give N-(2-diethylaminoethyl)-3-phenyladamantane-1-thiocarboxamide boiling at about 190–195° C. at 0.1 mm. pressure.

EXAMPLE 10

A mixture of 1.6 grams of N-(7-diethylaminoheptyl)-3-phenyladamantane-1-carboxamide, 0.3 grams of phosphorus pentasulfide, and 10 ml. of anhydrous pyridine is refluxed for 2 hours. The reaction mixture is then cooled to room temperature and poured into 400 ml. of cold water. An emulsion forms and this is extracted with benzene. The benzene extract is washed with water, dried over anhydrous sodium sulfate, and treated with charcoal. The filtrate which results is concentrated on a steam bath and purified by chromatography on silica gel to give a viscous orange syrup which is N-(7-diethylaminoheptyl)-3-phenyladamantane-1-thiocarboxamide.

Reaction of each of the compounds prepared in Examples 6 and 7 with phosphorus pentasulfide according to the procedure described in the preceding paragraph gives the corresponding thioamide in each instance.

EXAMPLE 11

To a refluxing solution of 2.8 grams of 3 - phenyladamantane - 1 - carboxylic acid in 30 ml. of anhydrous 2-propanol there is added 3.0 grams of 2-diethylaminoethyl chloride and the mixture is refluxed for 4 hours. The reaction mixture is cooled and allowed to stand for 16 hours and then filtered to remove a small amount of white solid. The solvent is then evaporated from the filtrate under reduced pressure and the residue is dissolved in 200 ml. of distilled water. The aqueous solution is made alkaline with potassium carbonate and the oil which forms is extracted with two 150-ml. portions of anhydrous ethyl ether. The combined extracts are dried over anhydrous sodium sulfate and filtered and the solvent is evaporated from the filtrate. The residue is distilled under reduced pressure to give a pale yellow oil boiling at about 188–192° C. at 0.3 mm. pressure. This oil is 2-diethylaminoethyl 3-phenyladamantane-1-carboxylate.

A solution of 1.6 grams of the above base in 200 ml. of anhydrous ethyl ether is treated with charcoal and filtered through diatomaceous earth. To the resulting filtrate is added 1.0 ml. of a 2-propanol solution containing 0.25 gram of anhydrous hydrogen chloride. A white precipitate forms. This is separated by filtration, dried in the air, and recrystallized from anhydrous benzene to give 2-diethylaminoethyl 3 - phenyladamantane-1-carboxylate hydrochloride melting at about 138–141° C. The free base of this compound has the following formula:

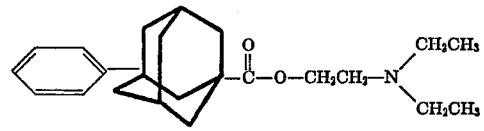

EXAMPLE 12

2-dimethylaminoethyl chloride, 3-dimethylaminopropyl chloride, 1 - (2 - chloroethyl)piperidine, 1 - (2 - chloroethyl)pyrrolidine, 4 - (2 - chloroethyl)morpholine, and 1-(2 - chloroethyl) - 4 - methylpiperazine are each reacted with 3 - phenyladamantane - 1 - carboxylic acid according to the procedure described in Example 11 to give, respectively, 2-dimethylaminoethyl 3-phenyladamantane-1-carboxylate,
3-dimethylaminopropyl 3-phenyladamantane-1-carboxylate,
2-piperidinoethyl 3-phenyladamantane-1-carboxylate,
2-(1-pyrrolidinyl)ethyl 3-phenyladamantane-1-carboxylate,
2-morpholinoethyl 3-phenyladamantane-1-carboxylate, and
2-(4-methyl-1-piperazinyl)ethyl 3-phenyladamantane-1-carboxylate.

Likewise, 1-(3-chloropropyl)piperidine, 1 - (3 - chloropropyl)pyrrolidine, 4 - (3 - chloropropyl)morpholine, and 1 - (3 - chloropropyl)-4-methylpiperazine are each reacted with 3 - phenyladamantane - 1 - carboxylic acid to give the corresponding ester in each instance.

EXAMPLE 13

The acid chloride obtained from 2.5 grams of 3-phenyladamantane - 1 - carboxylic acid is reacted with 1.8 grams of 5-diethylaminopentanol according to the procedure described in Example 3 to give 5-diethylaminopentyl 3-phenyladamantane - 1 - carboxylate. An ether solution of 1.7 grams of this base is mixed with an ether solution of oxalic acid. The precipitate which forms is separated by filtration and recrystallized from ethyl acetate to give 5-diethylaminopentyl 3-phenyladamantane - 1 - carboxylate oxalate melting at about 98–100° C.

EXAMPLE 14

3 - phenyladamantane - 1 - carbonyl chloride is prepared from 2.0 grams of 3-phenyladamantane-1-carboxylic acid according to the procedure described in the Example 1 and dissolved in 20 ml. of pyridine. To this solution is added a solution of 1.6 grams of 2-dimethylaminoethanethiol hydrochloride in 30 ml. of pyridine. The mixture is heated on a steam bath for one hour and then allowed to stand for 16 hours. The solvent is evaporated under reduced pressure and the resultant residue is dissolved in aqueous hydrochloric acid. The solution is then made alkaline with aqueous sodium hydroxide and extracted with ether. The ether solution is washed with water and dried over anhydrous sodium sulfate and the solvent is evaporated to leave a residual oil which is S-(2-dimethylaminoethyl) 3 - phenyladamantane - 1 - thiocarboxylate. This free amine is dissolved in 2-propanol and mixed with a solution of hydrogen chloride in 2-propanol. The precipitate which forms is separated by filtration and recrystallized from 2-propanol to give S-(2-dimethylaminoethyl) 3 - phenyladamantane - 1 - thiocarboxylate hydrochloride (containing ⅓ molecule of water of hydration) melting at about 203–205° C. with decomposition.

The free base of this compound has the following formula:

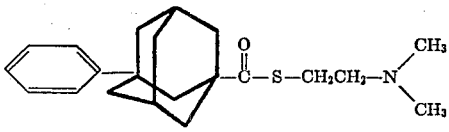

What is claimed is:
1. A compound of the formula

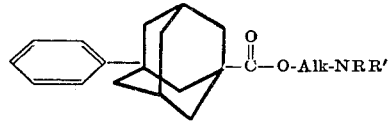

wherein Alk is alkylene containing from 2 to 7 carbon atoms and separating the atoms attached thereto by at least two carbon atoms; and —NRR' is selected from the group consisting of di(loweralkyl)amino, 1-pyrrolidinyl, piperidino, morpholino, and 4-methyl-1-piperazinyl.

2. A compound according to claim 1 which is 2-diethylaminoethyl 3-phenyladamantane-1-carboxylate.

3. A compound according to claim 1 which is 5-diethylaminopentyl 3-phenyladamantane-1-carboxylate.

References Cited

UNITED STATES PATENTS

| | | | |
|---|---|---|---|
| 3,300,480 | 1/1967 | Narayanan | 260—268 PA |
| 3,379,754 | 4/1968 | Bernstein | 260—519 |

FOREIGN PATENTS

| | | |
|---|---|---|
| 1,556,794 | 2/1969 | France. |

LORRAINE A. WEINBERGER, Primary Examiner

P. J. HAGAN, Assistant Examiner

U.S. Cl. X.R.

260—247.2 B, 268 PA, 293.56, 326.3; 424—299